United States Patent [19]
Houpt et al.

[11] Patent Number: 5,595,766
[45] Date of Patent: Jan. 21, 1997

[54] SPINNER FOR DUAL COMPONENT FIBERS HAVING MULTIPLE EXITS FOR EACH INLET

[75] Inventors: Ronald A. Houpt, Newark; Dennis C. Souers, Columbus, both of Ohio

[73] Assignee: Owens-Corning Fiberglas Technology, Inc., Summit, Ill.

[21] Appl. No.: 309,306

[22] Filed: Sep. 20, 1994

[51] Int. Cl.⁶ .......................... C03B 37/022; B29C 67/00
[52] U.S. Cl. .................. 425/8; 65/504; 65/521; 425/464; 425/DIG. 217
[58] Field of Search ................ 425/8, 464, DIG. 217; 65/521, 522, 504, 438, 470; 264/8

[56] References Cited

U.S. PATENT DOCUMENTS

| | | | |
|---|---|---|---|
| 2,927,621 | 3/1960 | Slayter et al. | 65/504 |
| 2,984,864 | 5/1961 | Levecque et al. | 425/8 |
| 2,998,620 | 9/1961 | Stalego | 65/504 |
| 3,073,005 | 1/1963 | Tiede | 65/438 |
| 3,190,736 | 6/1965 | Benner | 425/8 |
| 3,245,768 | 4/1966 | Simmers | 425/8 |
| 3,340,572 | 9/1967 | Lurie | 425/464 |
| 3,387,327 | 6/1968 | Privott, Jr. et al. | 425/DIG. 217 |
| 3,460,199 | 8/1969 | Heckrotte et al. | 425/DIG. 217 |
| 3,538,544 | 11/1970 | Ullman | 425/DIG. 217 |
| 4,934,916 | 6/1990 | Lambertus | 425/464 |
| 5,277,955 | 1/1994 | Schelhorn et al. | 428/74 |
| 5,431,992 | 7/1995 | Houpt et al. | 428/224 |

FOREIGN PATENT DOCUMENTS

| | | | |
|---|---|---|---|
| 1285098 | 12/1968 | Germany | 425/8 |
| 4-352805 | 12/1992 | Japan | 425/464 |

*Primary Examiner*—Robert B. Davis
*Attorney, Agent, or Firm*—C. Michael Gegenheimer; Timothy W. Hagan

[57] ABSTRACT

Apparatus for making dual component fibers is provided and includes a spinner having a peripheral wall. The spinner includes orifices located on the exterior of the peripheral wall for centrifuging dual component fibers, with the spinner being divided into at least two compartments. The first and second molten thermoplastic materials are supplied to the spinner and directed into alternate ones of the compartments so that adjacent compartments contain different thermoplastic materials. Passages are located in each of the compartments through which the molten thermoplastic materials flow to the orifices on the peripheral wall of the spinner. At least some of the passages have branches which form a common inlet adjacent to the interior of the peripheral wall and which communicate with at least two different orifices on the peripheral wall of the spinner.

26 Claims, 4 Drawing Sheets

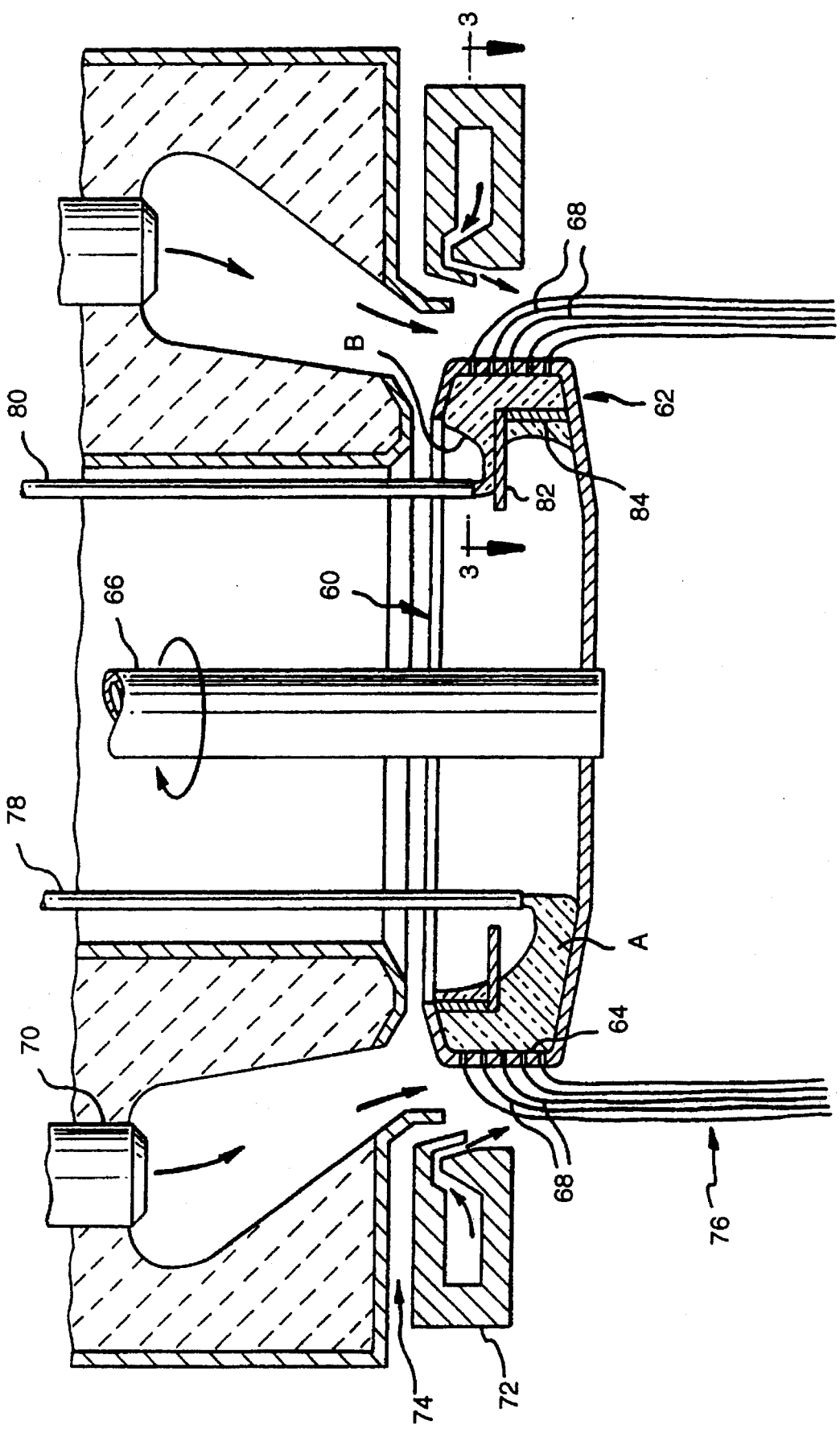

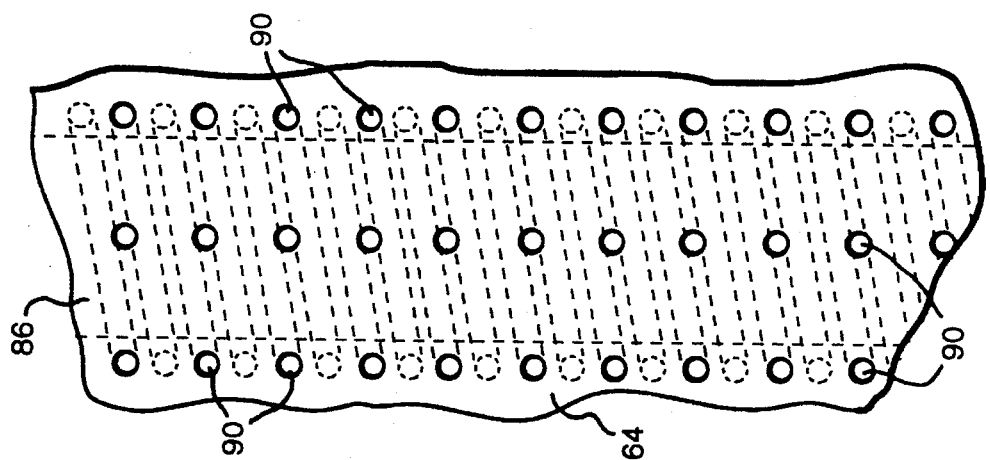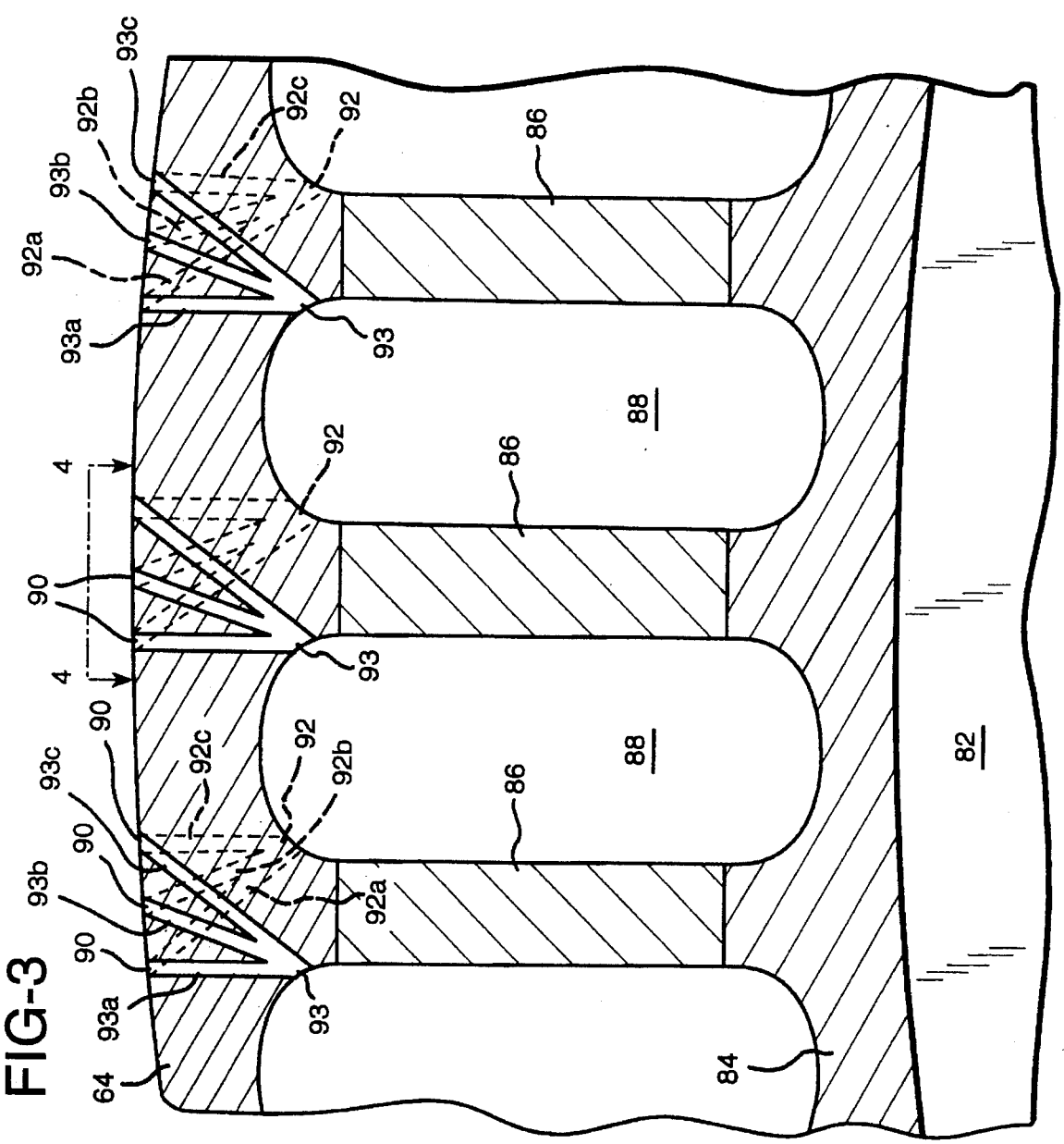

SPINNER FOR DUAL COMPONENT FIBERS HAVING MULTIPLE EXITS FOR EACH INLET

BACKGROUND OF THE INVENTION

This invention relates to an apparatus for manufacturing dual component fibers from thermoplastic materials, and more particularly to a spinner apparatus for centrifuging dual component fibers from two streams of molten thermoplastic materials such as glass or other mineral fibers or polymer fibers.

Fibers of glass and other thermoplastic materials are useful in a variety of applications including acoustical or thermal insulation materials. Common prior art methods for producing glass fiber insulation products involve producing glass fibers from a rotary process. A single molten glass composition is forced through the orifices in the outer wall of a centrifuge commonly known as a spinner, producing primarily short, straight glass fibers.

The temperatures of molten glasses used in rotary fiberizing processes may exceed 2000° F. (1093° C.). Because of the high temperatures involved and the high rotational speeds of the spinners, the materials of construction for such devices present many demands on those materials to withstand those conditions. Corrosion resistance is also required so that the orifices in the spinner maintain their designed size and shape.

A modification of conventional glass fibers, which are usually straight fibers, is the use of fibers which are curly (helical) in shape. These fibers can be made by joining two distinct glass streams, commonly referred to as the A glass and B glass streams, and centrifuging the dual glass stream into a curly (helical) fiber.

Stalego, U.S. Pat. No. 2,998,620, discloses curly (helical) glass fibers of bicomponent glass compositions. Stalego discloses producing staple curly fibers by passing two glass compositions having differing coefficients of thermal expansion through the orifices of a spinner. The glasses are extruded as a dual glass stream in aligned integral relationship such that the fibers curl naturally upon cooling due to the differences in their coefficients of thermal expansion. Stalego discloses in one embodiment a spinner having vertically aligned compartments separated by vertical baffles around the periphery of the spinner, with alternate compartments containing the different glasses. The patentee teaches that an orifice wider than the baffle is to be drilled where the baffle intersects the spinner peripheral wall. As the orifice is wider than the baffle, the orifice is in communication with both of the vertical compartments on either side of the baffle, and both the A glass and B glass will exit the spinner from the orifice, forming a dual glass stream.

However, there remains a need in this art for improving the delivery of dual streams of molten glasses to form dual glass or other thermoplastic fibers, including increasing the throughput capacity of such spinners.

SUMMARY OF THE INVENTION

This need is met by the present invention in which a series of orifices are positioned in the spinner peripheral wall which are fed with different molten thermoplastic materials by passages from adjacent compartments in the spinner to form dual component fibers. The throughput of the spinner is increased by including branches in the passages which have a common inlet but branch into two or more passages to communicate with two or more different orifices on the spinner peripheral wall. For purposes of this patent specification, in using the terms "glass fibers" and "glass compositions", "glass" is intended to include any of the glassy forms of materials such as rock, slag, and basalt, as well as traditional glasses. Thermoplastic materials and thermoplastic fibers include, in addition to glass and other mineral fibers, fibers from polymer materials such as polyester fibers and polypropylene fibers.

In accordance with one aspect of the present invention, apparatus for making dual component fibers is provided and includes a spinner having a peripheral wall. The spinner includes orifices located on the exterior of the peripheral wall for centrifuging dual component fibers, with the spinner being divided into at least two compartments.

The first and second molten thermoplastic materials are supplied to the spinner by any suitable equipment. For example, if the materials are glasses, the equipment will include melting furnaces and forehearths to supply the two molten glasses. A divider is provided for directing the first molten thermoplastic material into alternate ones of the compartments and for directing the second molten thermoplastic material into the remaining ones of the compartments so that adjacent compartments contain different thermoplastic materials.

In one embodiment of the invention, the divider includes a generally horizontal flange positioned intermediate the spinner peripheral wall which divides the spinner into upper and lower compartments. In another embodiment, the spinner is divided into a series of generally vertically-aligned compartments by baffles positioned circumferentially around the interior of the peripheral wall.

Passages are located in each of the compartments through which the molten thermoplastic materials flow to the orifices on the peripheral wall of the spinner. At least some of the passages have branches which form a common inlet adjacent to the interior of the peripheral wall and which communicate with at least two different orifices on the peripheral wall of the spinner. In a preferred embodiment of the invention, the branches communicate with three different orifices on the peripheral wall of the spinner.

Preferably, there are complementary branches in the passages in adjacent compartments. That is, individual ones of the branches in the passages in adjacent ones of the compartments communicate with one another and with the orifices to join the first and second molten thermoplastic materials together into dual component fibers.

In one preferred form, adjacent ones of the branches in adjacent compartments join together in either a V- or Y-shape. Preferably, the branches in the passages in adjacent compartments converge at an angle of from about 20° to 45°. The passages are sized to provide a build up of molten thermoplastic materials in the compartments. The passages in the adjacent compartments are of substantially the same diameter and length so that substantially equal proportions of the two molten thermoplastic materials are provided to the orifices. However, it should be appreciated that the diameter and length of the passages and passage branches may be controlled to vary the ratios of the two molten thermoplastic materials which are delivered to the orifices on the outer spinner peripheral wall. In a preferred embodiment, the branches in the passages have a diameter of from about 0.01 to about 0.04 inches (0.25 to 1.0 mm).

In a preferred embodiment of the invention, the thermoplastic materials are glasses, and the spinner is adapted to receive two separate molten glass streams for fiberization into dual glass fibers.

Accordingly, it is a feature of the present invention to provide a series of orifices positioned in a spinner peripheral wall which are fed with different molten thermoplastic materials by passages from adjacent compartments to form dual component fibers. It is another feature of the present invention to increase the throughput of the spinner by including branches in those passages which have a common inlet but branch into several passages to communicate with two or more orifices on the spinner peripheral wall. These, and other features and advantages of the present invention will become apparent from the following detailed description, the accompanying drawings, and the appended claims.

BRIEF DESCRIPTION OF THE DRAWINGS

FIG. 2 is a cross-sectional view in elevation of the fiberizer/spinner used in the practice of the invention;

FIG. 3 is a top plan view, partly in section, of a portion of the spinner taken along line 3—3 of FIG. 2, showing the branches in the passages communicating between the interior compartments and orifices on the spinner peripheral wall;

FIG. 4 is a schematic partial view, taken in elevation, of the exterior face of the spinner peripheral wall taken along line 4—4 in FIG. 3;

DETAILED DESCRIPTION OF THE PREFERRED EMBODIMENTS

The invention will be described in terms of apparatus for making irregularly-shaped dual glass fibers, although it is to be understood that the invention encompasses apparatus for making not only other types of dual glass fibers such as curly (helical) fibers, but also dual component fibers of other thermoplastic materials such as polyester or polypropylene, or combinations of glass and polymer.

Figure 1:
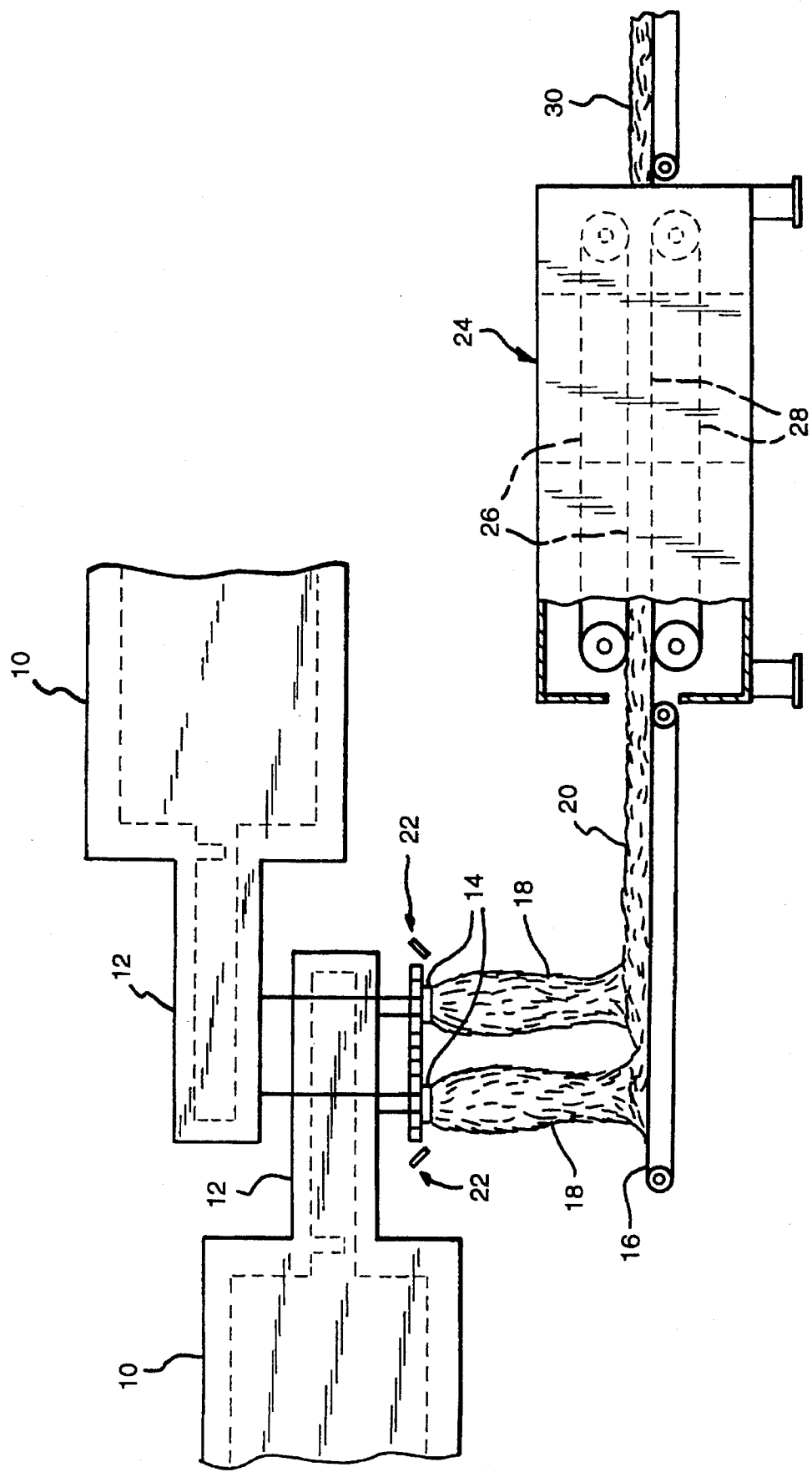
FIG. 1 is a schematic view in elevation of apparatus for making dual component fibers in accordance with the present invention.

The insulation products of irregularly-shaped glass fibers may be produced from a rotary fiber forming and pack heat setting process as shown in FIG. 1. Two distinct molten glass compositions (A glass and B glass) are supplied from any suitable source of glass such as furnaces 10 and forehearths 12 to rotary fiberizers 14. Preferably, the glasses have different mechanical attributes so that upon cooling, they will assume an irregular (as opposed to straight) configuration. Such different mechanical attributes may be, for example, differing coefficients of thermal expansion, differing melting points, differing viscosities, or differing mechanical strengths. Veils 18 of dual glass fibers, such as irregularly-shaped glass fibers produced by the fiberizers, are collected on conveyor 16 as wool pack 20 by means of a vacuum (not shown) positioned beneath the conveyor. As the fibers are blown downwardly by air or gases to conveyor 16 by means of blowers 22 adjacent the fiberizers, they are attenuated, cool, and attain their irregular shape.

The wool pack 20 may then optionally be passed through oven 24 at heat setting temperatures of from about 700° to 1200° F. (371° to 650° C.). The heat setting temperature may be achieved either by retarding the fiber cooling process after fiber forming to retain some of the heat from the fiber forming process, or by reheating the fibers in heat setting oven 24. While passing through the oven, wool pack 20 is shaped by top conveyor 26 and bottom conveyor 28, and by edge guides (not shown). While in oven 24, the glass fibers may be subjected to flows of hot gases to facilitate uniform heating. When the fibers are constrained by conveyors 26 and 28, the fibers are stressed in the manner of a compressed spring. When subjected to heat setting temperatures, the fibers relax, reducing stress, so that the wool pack holds its desired shape. After a period of up to 15 minutes, the wool pack then exits oven 24 as insulation product 30.

It is to be understood that heat setting is an optional aspect of the present invention. The fibers may be directly formed and collected into a wool pack. Alternatively, the wool pack may be encapsulated with an exterior plastic layer as taught by Schelhorn et al, U.S. Pat. No. 5,277,955, the disclosure of which is hereby incorporated by reference. Further, the wool pack may be subjected to other fabrication techniques including stitching, needling, or hydro-entanglement.

As shown in FIG. 2, spinner 60 includes a spinner peripheral wall 64 and a spinner bottom wall 62. The spinner is rotated on spindle 66, as is known in the art. The rotation of the spinner centrifuges molten glass through orifices in spinner peripheral wall 64 to form primary fibers 68. The primary fibers 68 are maintained in a soft, attenuable condition by the heat of annular burner 70. An internal burner (not shown) may also be used to provide heat to the interior of spinner 60. Annular blower 72, using induced air through passage 74, is positioned to pull primary fibers 68 and further attenuate them into secondary dual-glass fibers 76, suitable for use in wool insulating materials. The dual-glass irregularly-shaped glass fibers are then collected on a conveyor (as shown in FIG. 1) for formation into a wool pack.

The interior of spinner 60 is supplied with two separate streams of molten glass, first stream 78 containing glass A and second stream 80 containing glass B. The glass in stream 78 drops directly onto spinner bottom wall 62 and flows outwardly due to the centrifugal force toward spinner peripheral wall 64 to form a head of glass A as shown. Glass B in molten glass stream 80 is positioned closer to spinner peripheral wall 64 than stream 78, and the B glass in stream 80 is intercepted by horizontal flange 82 before it can reach the spinner bottom wall. Thus, a build-up or head of glass B is formed above horizontal flange 82 as shown.

One embodiment of the invention is shown in FIGS. 3 and 4. In this embodiment, spinner 60 is adapted with a vertical interior wall 84 which is generally circumferential and positioned radially inwardly from the spinner peripheral wall 64. Also shown is horizontal flange 82 which abuts interior wall 84 and is positioned generally midway between spinner bottom wall 62 and the top of the spinner. A series of vertical baffles 86, positioned between spinner peripheral wall 64 and vertical interior wall 84, divide that space into a series of generally vertically-aligned compartments 88 which run substantially the entire height of spinner peripheral wall 64. Alternate compartments contain glass A and glass B which flow, respectively, into compartments 88 through slots (not shown) in interior wall 84. It can be seen that horizontal flange 82, vertical interior wall 84, and baffles 86 together comprise a divider for directing glasses A and B into alternating adjacent compartments 88 so that every other compartment contains glass A while the remaining compartments contain glass B.

As best seen in FIG. 4, the exterior of spinner peripheral wall 64 has a series of orifices 90 thereon. In the embodiment of the invention illustrated, orifices 90 are positioned in three generally vertical columns in general alignment with vertical baffles 86. A typical spinner may have as many as several hundred individual compartments 88, and several thousand orifices 90. As can be seen in FIG. 3, a series of passages 92 and 93 are located in each of the compartments 88 through which molten thermoplastic material will flow. As shown, each respective passage includes three branches 92a, 92b, 92c, and 93a, 93b, and 93c. However, it should be appreciated that the number of branches can vary from two to four or more. Preferably, respective passages 92 and 93 are located adjacent either side of baffles 86, and their respective branches are angled to communicate with one another and with orifices 90 on the outer surface or peripheral wall 64. Thus, branch 92a communicates with adjacent branch 93a, branch 92b communicates with adjacent branch 93b, and branch 92c communicates with adjacent branch 93c.

Passages 92 and 93, as well as their respective branches, are preferably sized to provide equal flow lengths for the A and B glass components in adjacent compartments 88 to orifices 90 on the exterior of peripheral wall 64. This ensures that when the A and B components exit orifices 90 in side-by-side relation, there will be approximately equal amounts of A and B glasses for each fiber. It will be recognized that if unequal amounts of A and B glasses are desired, the passages 92 and 93, and their respective branches, may be sized to provide for unequal amounts of flow resulting in unequal proportions in the dual component fiber. Further, a mixture of dual component fibers having differing amounts of A and B glasses may be produced by using some equal and some unequal branches. Such a result may be desirable in certain instances. Additionally, the passages in each compartment may vary in size to provide a variation in the ratios of A and B glasses in the dual component fibers formed.

Typically, passages 92 and 93 will have diameters in the range of from about 0.01 to about 0.04 inches (0.25 to about 1.0 mm), and preferably from about 0.015 to about 0.025 inches (0.38 to about 0.63 mm). The number of passages formed depends on the height and diameter of the spinner peripheral wall. The number and size of the passages, as well as the flow rate of the molten glasses into compartments 88 is chosen to build up a "head" of molten material covering the passages in each compartment. Further, while the orifices are shown as being circular in cross-section, it will be appreciated that other noncircular configurations such as elongated slots may be used.

Orifices 90, passages 92 and 93, and branches 92a–c and 93a–c, may be drilled into the spinner wall by any of several known drilling techniques such as laser drilling, mechanical drilling, electrical discharge milling (EDM), or electron beam drilling. As shown in FIG. 3, complementary branches of passages 92 and 93 are preferably drilled to come together at an angle of from about 20° to about 45°.

Figure 5:
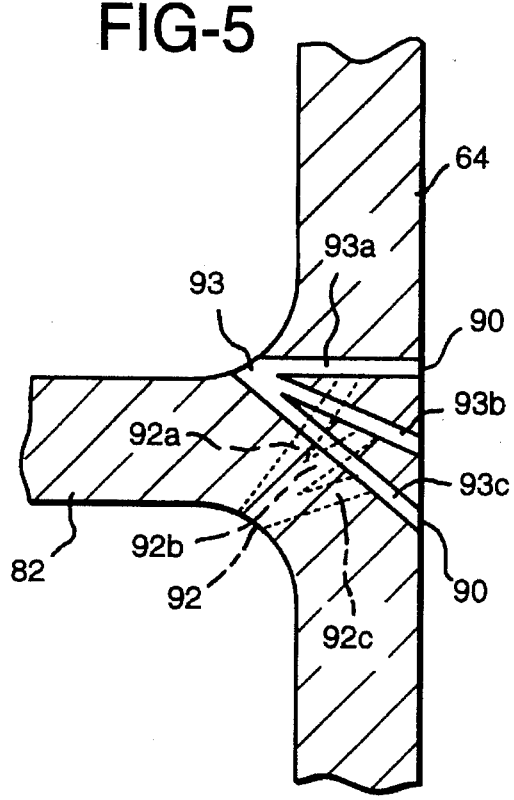
FIG. 5 is a greatly enlarged sectional view of an alternative embodiment of the invention in which the branches form Y-shaped passages.
Figure 6:
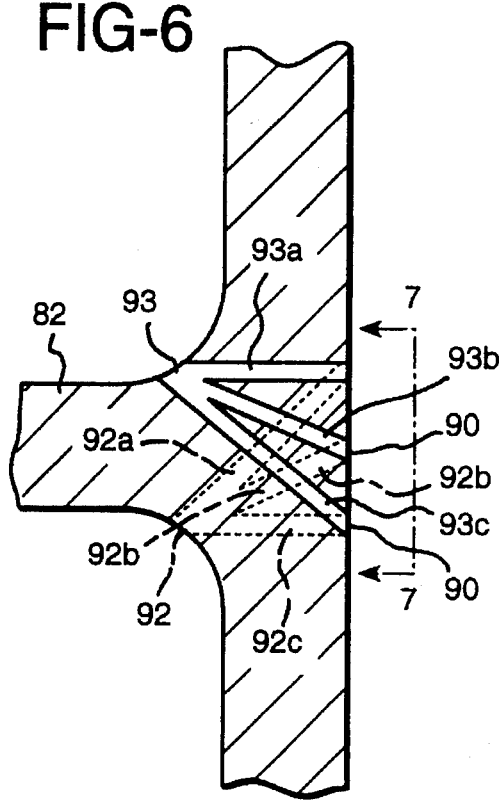
FIG. 6 is an enlarged sectional view of another embodiment of the invention in which the spinner is divided into upper and lower compartments.
Figure 7:
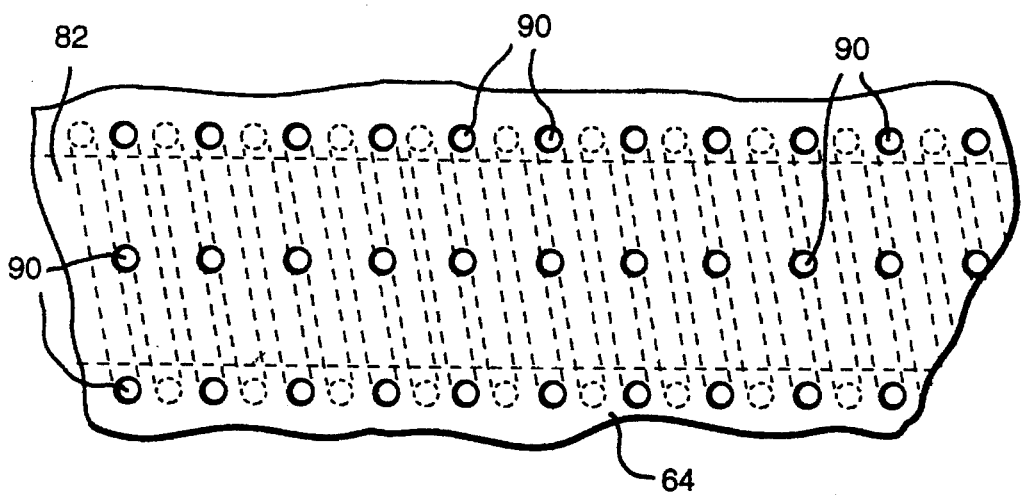
FIG. 7 is a schematic partial view, taken in elevation, of the exterior face of the spinner peripheral wall taken along line 7—7 in FIG. 6.

Referring now to FIGS. 5–7, other embodiments of the invention are shown. In these embodiments, horizontal flange 82 divides the spinner 60 into upper and lower adjacent compartments. Passages 92 and 93 are drilled from opposite sides of flange 82 to connect to orifices 90 on the exterior face of spinner wall 64. As shown in FIG. 7, orifices 90 form a circumferential pattern around the periphery of the spinner. Depending upon the angle chosen, passages 92 and 93 may form a V-shape as shown in FIG. 6, or a Y-shape as shown in FIG. 5.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

We claim:

1. Apparatus for making dual component fibers comprising:

a) a spinner having a peripheral wall, and further including orifices located on the exterior of said peripheral wall for centrifuging dual component fibers, said spinner being divided into at least two compartments;

b) equipment for supplying first and second molten thermoplastic materials to said spinner;

c) a divider for directing said first molten thermoplastic material into alternate ones of said compartments and for directing said second molten thermoplastic material into the remaining ones of said compartments so that adjacent compartments contain different thermoplastic materials; and d) passages in each of said compartments through which said molten thermoplastic materials flow to said orifices on said peripheral wall of said spinner, at least some of said passages having branches which form a common inlet adjacent to the interior of said peripheral wall and which communicate with at least two different orifices on said peripheral wall of said spinner.

2. An apparatus as claimed in claim 1 in which said branches communicate with three different orifices on said peripheral wall of said spinner.

3. An apparatus as claimed in claim 1 in which individual ones of said branches in said passages in adjacent ones of said compartments communicate with one another and with said orifices.

4. An apparatus as claimed in claim 3 in which adjacent ones of said branches in adjacent compartments join together in a V-shape.

5. An apparatus as claimed in claim 3 in which adjacent ones of said branches in adjacent compartments join together in a Y-shape.

6. An apparatus as claimed in claim 3 in which adjacent ones of said branches in adjacent compartments converge at an angle of from about 20° to 45°.

7. An apparatus as claimed in claim 1 in which said branches in said passages have a diameter of from about 0.01 to about 0.04 inches.

8. An apparatus as claimed in claim 1 in which said passages are sized to provide a build up of molten thermoplastic materials in said compartments.

9. An apparatus as claimed in claim 1 in which said passages in said adjacent compartments are of substantially the same diameter and length.

10. An apparatus as claimed in claim 1 in which said passages in said adjacent compartments are of unequal diameter or length.

11. An apparatus as claimed in claim 1 in which said divider includes a generally horizontal flange positioned intermediate the spinner peripheral wall which divides said spinner into upper and lower compartments.

12. An apparatus as claimed in claim 1 in which said spinner is divided into a series of generally vertically-aligned compartments by baffles positioned circumferentially around the interior of said peripheral wall.

13. Apparatus for making dual glass fibers comprising:

a) a spinner having a peripheral wall, and further including orifices located on said peripheral wall for centrifuging dual glass fibers, said spinner being divided into at least two compartments;

b) equipment for supplying first and second molten glasses to said spinner;

c) a divider for directing said first molten glass into alternate ones of said compartments and for directing said second molten glass into the remaining ones of said compartments so that adjacent compartments contain different thermoplastic materials; and d) passages in each of said compartments through which said molten glasses flow to said orifices on said peripheral wall of said spinner, at least some of said passages having branches which form a common inlet adjacent to the interior of said peripheral wall and which communicate with at least two different orifices on said peripheral wall of said spinner.

14. An apparatus as claimed in claim 13 in which said branches communicate with three different orifices on said peripheral wall of said spinner.

15. An apparatus as claimed in claim 14 in which individual ones of said branches in said passages in adjacent ones of said compartments communicate with one another and with said orifices.

16. An apparatus as claimed in claim 14 in which adjacent ones of said branches in adjacent compartments join together in a V-shape.

17. An apparatus as claimed in claim 14 in which adjacent ones of said branches in adjacent compartments join together in a Y-shape.

18. An apparatus as claimed in claim 14 in which adjacent ones of said branches in adjacent compartments converge at an angle of from about 20° to 45°.

19. An apparatus as claimed in claim 13 in which said branches in said passages have a diameter of from about 0.01 to about 0.04 inches.

20. An apparatus as claimed in claim 13 in which said passages are sized to provide a build up of molten glass in said compartments.

21. An apparatus as claimed in claim 13 in which said passages in said adjacent compartments are of substantially the same diameter and length.

22. An apparatus as claimed in claim 13 in which said passages in said adjacent compartments are of unequal diameter or length.

23. An apparatus as claimed in claim 13 in which said divider includes a generally horizontal flange positioned intermediate the spinner peripheral wall which divides said spinner into upper and lower compartments.

24. An apparatus as claimed in claim 13 in which said spinner is divided into a series of generally vertically-aligned compartments by baffles positioned circumferentially around the interior of said peripheral wall.

25. An apparatus as claimed in claim 1 in which said passages in said adjacent compartments are of unequal diameter and length.

26. An apparatus as claimed in claim 13 in which said passages in said adjacent compartments are of unequal diameter and length.

* * * * *